United States Patent
Liu (10) Patent No.: US 10,004,263 B2
(45) Date of Patent: Jun. 26, 2018

(54) ELECTRONIC CIGARETTE PROVIDED WITH ACCUMULATED E-LIQUID REMOVAL FUNCTION, AND METHOD THEREFOR

(71) Applicant: KIMREE HI-TECH INC., Road Town, Tortola (VG)

(72) Inventor: Qiuming Liu, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days. days.

(21) Appl. No.: 15/124,180

(22) PCT Filed: Mar. 7, 2014

(86) PCT No.: PCT/CN2014/073065
§ 371 (c)(1),
(2) Date: Sep. 7, 2016

(87) PCT Pub. No.: WO2015/131401
PCT Pub. Date: Sep. 11, 2015

(65) Prior Publication Data
US 2017/0013882 A1    Jan. 19, 2017

(51) Int. Cl.
*A24F 47/00* (2006.01)
*G05D 23/19* (2006.01)
*H05B 1/02* (2006.01)

(52) U.S. Cl.
CPC ....... *A24F 47/008* (2013.01); *G05D 23/1917* (2013.01); *H05B 1/0244* (2013.01); *H05B 2203/021* (2013.01)

(58) Field of Classification Search
CPC ............ H05B 2203/021; H05B 1/0244; G05D 23/1917; A24F 47/008
(Continued)

(56) References Cited

U.S. PATENT DOCUMENTS 9,682,800 B2 * 6/2017 Xiang ..................... B65D 25/00
2013/0284192 A1 * 10/2013 Peleg ...................... A24F 47/002
131/329
(Continued)

FOREIGN PATENT DOCUMENTS

CN    203121011 U    8/2013
CN    203168035 U    9/2013
(Continued)

OTHER PUBLICATIONS

International Search Report (ISR) issued by the State Intellectual Property Office of the Peoples Republic of China dated Dec. 17, 2014 for PCT/CN2014/073065, China.

*Primary Examiner* — Abdullah Riyami
*Assistant Examiner* — Nelson R Burgos-Guntin
(74) *Attorney, Agent, or Firm* — Tim Tingkang Xia, Esq.; Locke Lord LLP (57) ABSTRACT

An electronic cigarette provided with an accumulated e-liquid removal function and a method for removing accumulated e-liquid of an electronic cigarette. The electronic cigarette comprises an atomization assembly for atomizing e-liquid to produce smoke and a battery rod assembly configured for supplying power. The electronic cigarette is provided with a smoke channel for smoke to flow through, a heating assembly provided in the smoke channel and a control assembly for controlling the heating assembly which is configured for re-atomizing non-atomized e-liquid accumulated in the smoke channel. Implementation of the electronic cigarette provided with the accumulated e-liquid removal function and the present method for removing accumulated e-liquid provides the following beneficial effect: the heating assembly provided in the smoke channel is controlled by the control assembly to produce heat to allow e-liquid accumulated in the smoke channel to be (Continued)

re-atomized, thereby achieving the goal of removal of the accumulated e-liquid.

18 Claims, 7 Drawing Sheets

(58) Field of Classification Search
USPC .......................................... 131/271, 273, 329
See application file for complete search history.

(56) References Cited

U.S. PATENT DOCUMENTS

| | | | | |
|---|---|---|---|---|
| 2014/0254055 A1* | 9/2014 | Xiang | ...................... | H02H 7/20 361/86 |
| 2014/0285937 A1* | 9/2014 | Xiang | ...................... | H02H 3/202 361/91.2 |
| 2014/0291179 A1* | 10/2014 | Xiang | ...................... | B65D 25/00 206/216 |
| 2014/0299138 A1* | 10/2014 | Xiang | ...................... | A24F 47/008 131/329 |
| 2014/0354215 A1* | 12/2014 | Xiang | ...................... | H02J 7/0052 320/107 |
| 2014/0354231 A1* | 12/2014 | Xiang | ...................... | H02J 7/0042 320/114 |
| 2015/0036250 A1* | 2/2015 | Xiang | ...................... | H02J 7/0029 361/78 |
| 2015/0082859 A1* | 3/2015 | Xiang | ...................... | G01F 25/0007 73/1.35 |
| 2015/0245660 A1* | 9/2015 | Lord | ...................... | A24F 47/008 131/328 |
| 2015/0257448 A1* | 9/2015 | Lord | ...................... | A24F 47/008 700/90 |
| 2015/0333561 A1* | 11/2015 | Alarcon | ................. | H02J 7/0042 131/329 |
| 2015/0374040 A1* | 12/2015 | Chen | ...................... | G01R 31/04 131/328 |
| 2016/0049808 A1* | 2/2016 | Chen | ...................... | H02J 7/008 320/134 |
| 2016/0143359 A1* | 5/2016 | Xiang | ................... | A24F 47/008 392/387 |
| 2016/0226286 A1* | 8/2016 | Xiang | ................... | A24F 47/002 |
| 2016/0249684 A1* | 9/2016 | Liu | ....................... | A24F 47/008 131/328 |
| 2016/0374401 A1* | 12/2016 | Liu | ....................... | A24F 47/008 131/328 |
| 2017/0013882 A1* | 1/2017 | Liu | ....................... | A24F 47/008 |
| 2017/0042247 A1* | 2/2017 | Xiang | ................... | A24F 47/00 |
| 2017/0071260 A1* | 3/2017 | Li | ......................... | A24F 47/008 |
| 2017/0105455 A1* | 4/2017 | Qiu | ...................... | A24F 47/008 |
| 2017/0109877 A1* | 4/2017 | Peleg | ................... | G06T 7/0008 |
| 2017/0119052 A1* | 5/2017 | Williams | ............. | H05B 3/0014 |
| 2017/0135410 A1* | 5/2017 | Cameron | .............. | A24F 47/008 |
| 2017/0181475 A1* | 6/2017 | Cameron | .............. | A24F 47/008 |
| 2017/0185364 A1* | 6/2017 | Cameron | .............. | G06F 3/1446 |
| 2017/0202266 A1* | 7/2017 | Sur | ...................... | A24F 47/008 |
| 2017/0215485 A1* | 8/2017 | Zitzke | ................... | A24F 47/008 |
| 2017/0224016 A1* | 8/2017 | Reevell | ................. | A24F 47/008 |
| 2017/0231278 A1* | 8/2017 | Mironov | .............. | A24F 47/008 392/390 |
| 2017/0231281 A1* | 8/2017 | Hatton | ................. | A24F 47/008 131/328 |
| 2017/0251724 A1* | 9/2017 | Lamb | .................... | A24F 47/008 |

FOREIGN PATENT DOCUMENTS

| | | |
|---|---|---|
| CN | 203378558 U | 1/2014 |
| WO | 2012174677 A1 | 12/2012 |

* cited by examiner

ELECTRONIC CIGARETTE PROVIDED WITH ACCUMULATED E-LIQUID REMOVAL FUNCTION, AND METHOD THEREFOR

TECHNICAL FIELD

The present application relates to the field of daily electrical products, and more particularly relates to an electronic cigarette provided with accumulated e-liquid removal function, and method therefor.

BACKGROUND

An electronic cigarette comprises an atomization assembly and a battery rod assembly. E-liquid in e-liquid reservoir is guided to the atomization assembly. When smoking, the battery rod assembly supplies power to the atomization assembly to produce heat. Therefore, the e-liquid is atomized to produce smoke for user to inhale in.

Some atomized e-liquid can be condensed when flowing in the smoke channel, or e-liquid leaks from the e-liquid reservoir. The accumulation of non-atomized e-liquid in the smoke channel would not only lead to inhale in e-liquid by smokers, but also result in blockage of the smoke channel and affect the user experience. More seriously, the more and more accumulated e-liquid in the smoke channel would flow out of the channel, leading to contamination of the electronic cigarette and the objects contacted with.

For this situation, the commonly used simple method is manual clean of the e-liquid, which would reduce the user experience.

Therefore, the prior art needs to be improved due to the defects.

BRIEF SUMMARY

The technical problems to be solved are: in respond to the defects of the prior art in electronic cigarette such as easily accumulating e-liquid that results in e-liquid inhalation or a blockage of smoke channel by e-liquid, the present invention supplies an electronic cigarette provided with an accumulated e-liquid removal function and an method for removing accumulated e-liquid of an electronic cigarette.

The technical solutions of the present application for solving the technical problems are as follows: an electronic cigarette provided with an accumulated e-liquid removal function is invented, the electronic cigarette comprises an atomization assembly used for atomizing an e-liquid to produce smoke and a battery rod assembly used for supplying power to the atomization assembly. The electronic cigarette is provided with a smoke channel for smoke to flow through. The electronic cigarette further comprises:

a heating assembly provided in the smoke channel used for re-atomizing non-atomized e-liquid accumulated in the smoke channel.

a control assembly used for controlling working of the heating assembly.

The electronic cigarette in present invention provided with an accumulated e-liquid removal function, the control assembly of the electronic cigarette provided with an accumulated e-liquid removal function comprises:

a smoking switch used for sending an inhalation signal;

a microprocessor control module is used for receiving the inhalation signal and controlling the battery rod assembly to supply power to the atomization assembly.

The microprocessor control module is further used for counting smoking times based on the inhalation signal and controlling the battery rod assembly to supply power to the heating assembly when the smoking times reach a default value, at the same time resetting the smoking times.

The electronic cigarette in present invention provided with an accumulated e-liquid removal function, wherein, the control assembly also comprises a first switch electrically connected to the microprocessor control module.

The microprocessor control module is further used for controlling the battery rod assembly charging for the heating assembly and resetting the smoking times when the first switch is triggered.

The electronic cigarette in the present invention provided with an accumulated e-liquid removal function, the smoking switch comprises an airflow sensor, a key switch or a touch switch.

The electronic cigarette in present invention provided with an accumulated e-liquid removal function, the smoking switch comprises an airflow sensor, the battery rod assembly comprises a battery, the atomization assembly comprises a first electric wire, the heating assembly comprises a second electric wire.

The microprocessor control module comprises a microcontroller whose type is SN8P2711B, a first MOS transistor used for controlling the electric connection between the first electric wire and the battery, a second MOS transistor used for controlling an electrical connection between the second electric wire and the battery, and a zener diode.

A VDD pin of the microcontroller is connected to a negative electrode of the zener diode, and a positive electrode of the zener diode is connected to a positive electrode of the battery. A signal output end of the airflow sensor is connected to a PO.2 pin of the microcontroller. Two ends of the first electric wire are connected to the positive electrode of the battery and a drain electrode of the first MOS transistor, two ends of the second electric wire are connected to the positive electrode of the battery and a drain electrode of the second MOS transistor, both source electrodes of the first MOS transistor and the second MOS transistor are connected to a negative electrode of the battery, grid electrodes of the first MOS transistor and the second MOS transistor are connected to a P5.3 pin and a P4.1 pin of the microcontroller, respectively.

The electronic cigarette in present invention provided with an accumulated e-liquid removal function, the microprocessor control module further comprises a capacitance, a resistance and a light-emitting diode used for smoking indication.

The VSS pin of the microcontroller is grounded through the capacitance, a positive electrode of the light-emitting diode is connected to the positive electrode of the battery, a negative electrode of the light-emitting diode is connected to a P5.4 pin of the microcontroller through the resistance.

The microcontroller is used for controlling a conducting of the light-emitting diode to light when receiving a triggering electrical signal. The capacitance is used for supplying a working voltage to the microcontroller with emergency power off.

The electronic cigarette in present invention provided with an accumulated e-liquid removal function, the control assembly further comprises a second switch, the heating assembly is electrically connected with the battery inside the battery rod assembly through the second switch.

The electronic cigarette in present invention provided with an accumulated e-liquid removal function, the heating assembly comprises a liquid guiding rope;

a second electric wire twined round an outside surface of the liquid guiding rope;

a ventilating pipe component used for fixed the liquid guiding rope.

The electronic cigarette in present invention provided with an accumulated e-liquid removal function, the ventilating pipe component comprises a first ventilating pipe used for fixing the liquid guiding rope, the first ventilating pipe is defined with at least two mounting hole used for allowing the liquid guiding rope to pass through.

The electronic cigarette in present invention provided with an accumulated e-liquid removal function, the ventilating pipe component further comprises:

a second ventilating pipe defined at one end of the first ventilating pipe and used for avoiding an e-liquid adhesion;

a third ventilating pipe and a fixed pipe defined outside the first ventilating pipe in sequence.

The electronic cigarette in present invention provided with an accumulated e-liquid removal function, the electronic cigarette comprises an e-liquid reservoir used for accommodating the e-liquid, the electronic cigarette is provided with a smoking end, the e-liquid reservoir is provided at an end opposite to the smoking end.

The electronic cigarette in present invention provided with an accumulated e-liquid removal function, the smoking end comprises a suction nozzle detachably connected to the battery rod assembly, the smoke channel comprises:

a first inlet port arranged on an outer surface of the electronic cigarette;

a first channel arranged in the suction nozzle;

a second channel arranged in the battery rod assembly and inner connected with the first inlet port and the first channel;

wherein, the heating assembly is arranged at the joint of the first channel and the second channel.

The electronic cigarette in present invention provided with an accumulated e-liquid removal function, wherein, the atomization assembly is mounted on a common axis with the battery rod assembly. The e-liquid reservoir is detachably connected to the atomization assembly;

and/or, the atomization assembly is detachably connected to the battery rod assembly.

The electronic cigarette in present invention provided with an accumulated e-liquid removal function, the smoke channel comprises:

a fan used for discharging smoke out of the smoke channel.

The control assembly is also used for controlling the fan working when controlling the heating assembly.

This invention discloses a method applied in electronic cigarette for removal of accumulated e-liquid. The electronic cigarette comprises an atomization assembly used for atomizing an e-liquid to produce smoke and a battery rod assembly used for supplying power to the atomization assembly. The electronic cigarette is provided with a smoke channel for smoke to flow through. The method comprises a heating assembly in the smoke channel used for re-atomizing non-atomized e-liquid accumulated in the smoke channel by controlling working of the heating assembly.

A method in present invention for removing accumulated e-liquid of an electronic cigarette, wherein, controlling the heating assembly for heat in the method of removing accumulated e-liquid comprises the following steps:

S0, a smoking switch sends an inhalation signal;

S1, a microprocessor control module receives the inhalation signal and controls the battery rod assembly to supply power to the atomization assembly. At the same time, the microprocessor control module counts the smoking times and adds one.

S2, the microprocessor control module determines whether the smoking times reach the default value, if yes, controls the battery rod assembly charging for the heating assembly, at the same time resets the smoking times, if no, waits for step S0.

The method of removing accumulated e-liquid of an electronic cigarette in present invention, wherein, the method further comprises:

when a manual removal of accumulated e-liquid is needed, at any moment, manually trigger the first switch of the electronic cigarette so that the microprocessor control module controls the battery rod assembly to supply power to the heating assembly and resets the smoking times.

The method of removing accumulated e-liquid in present invention, wherein, after controlling the battery rod assembly charging for the heating assembly further comprises:

after a presetting time, the microprocessor control module controls the battery rod assembly stopping to supplying power to for the heating assembly.

The method of removing accumulated e-liquid in present invention, wherein the step S2 in the method of removing accumulated e-liquid comprises in the present invention comprises: if the smoking times reach the default value, the microprocessor control module firstly controls the battery rod assembly to supply power to the atomization assembly, and when finishing that, the microprocessor control module controls the battery rod assembly to supply power to the heating assembly.

The method of removing accumulated e-liquid in present invention, wherein, the step S2 in the method of removing accumulated e-liquid in the present invention comprises: if the smoking times reach the default value, the microprocessor control module controls the battery rod assembly to supply power to the heating assembly and the atomization assembly together, the sum of the output power of the atomization assembly and the heating assembly is equal to the output power of the atomization assembly when individually working.

The method of removing accumulated e-liquid in present invention, wherein, a specific method is: when manual removal of accumulated e-liquid is needed, the user turns on the second switch of the electronic cigarette so that the heating assembly is electrically connected to the inner battery of the battery rod assembly through the second switch, and then the atomizing of the accumulated e-liquid begins. With finishing removing accumulated e-liquid, the heating assembly stopped atomizing when the user turns off the second switch.

Implementing the electronic cigarette provided with an accumulated e-liquid removal function and the method for removing accumulated e-liquid of an electronic cigarette in this invention, the following beneficial effects can be achieved: The electronic cigarette is provided with a smoke channel for smoke to flow through. In the present invention, the heating assembly provided in the smoke channel is controlled by the control assembly to produce heat to allow e-liquid accumulated in the smoke channel to be re-atomized, thereby achieving the goal of removal of the accumulated e-liquid and improvement of the user' experience.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENTS

In order to overcome the defects of the prior art in electronic cigarette that easily accumulating e-liquid that results in e-liquid inhalation by users or a blockage of smoke channel by e-liquid, the present invention supplies an electronic cigarette provided with an accumulated e-liquid removal function and an method for removing accumulated e-liquid of an electronic cigarette. In the present invention, the electronic cigarette provided with an accumulated e-liquid removal function is provided with a heating assembly in a smoke channel, non-atomized e-liquid accumulated in the smoke channel is re-atomized by controlling a control assembly to control the heating assembly to heat control assembly, thereby achieving the object of removal of the accumulated e-liquid and improvement of the user experience.

To make the technical feature, objective and effect of the present application be understood more clearly, now specific implementations of the present application are described in detail with reference to the accompanying drawings and embodiments.

Figure 1:
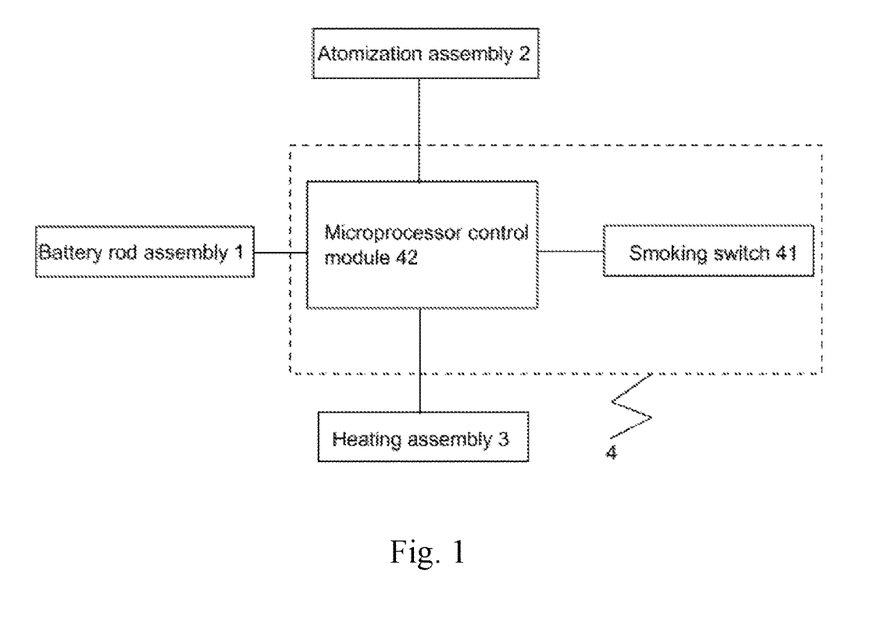
FIG. 1 is a principle diagram of an electronic cigarette provided with an accumulated e-liquid removal function in a first embodiment.

FIG. 1 is a principle diagram of an electronic cigarette provided with an accumulated e-liquid removal function of a first preferred embodiment of the present application.

In present invention, the electronic cigarette provided with an accumulated e-liquid removal function comprises an atomization assembly 2 used for atomizing an e-liquid to produce smoke and a battery rod assembly 1 used for supplying power to the atomization assembly 2. The electronic cigarette is provided with a smoke channel for smoke to flow through. The electronic cigarette further comprises a heating assembly 3 provided in the smoke channel and a control assembly 4 used for controlling working of the heating assembly 3. The heating assembly 3 is used for allowing the non-atomized e-liquid accumulated in the smoke channel to be re-atomized.

Wherein, the control assembly 4 can be controlled manually or automatically or a combination of both. In the first preferred embodiment of present application, the control assembly 4 is controlled automatically. The control assembly 4 specifically comprises a smoking switch 41 and a microprocessor control module 42.

The smoking switch 41 used for sending an inhalation signal comprises an airflow sensor, a key switch or a touch switch.

In the prior art, a controller or a switch is commonly used for controlling the battery rod assembly 1 and the atomization assembly 2, the microprocessor control module 42 of the present invention can be an independent module of the controller or the switch which is used to realize a function of controlling the battery rod assembly 1 and the atomization assembly 2, and the function of the controller or the switch can be realized by directly utilizing the microprocessor control module 42. In the present preferred embodiment, on one hand, the microprocessor control module 42 is used for receiving the inhalation signal and controlling the battery rod assembly 1 to supply power to the atomization assembly 2, at this point, the function of the microprocessor control module 42 is same as that of the controller or switch; on the other hand, the microprocessor control module 42 is further used for counting the smoking times based on the inhalation signal and controlling the battery rod assembly 1 to supply an electrical power to the heating assembly 3 when the smoking times reach a default value, and resetting the smoking times at the same time.

Preferably, when the smoking times reach the default value, there are two controlling methods as following:

The first kind is: the microprocessor control module 42 firstly controls the battery rod assembly 1 to supply an electrical power to the atomization assembly 2, and when a supplication of the electrical power of the atomization assembly 2 is finished, the microprocessor control module 42 controls the battery rod assembly 1 to supply an electrical power to the heating assembly 3. Which means that, a smoke inhalation of a smoker is taken as a priority, the accumulated e-liquid is only atomized when the smoker finishes the smoke inhalation. Otherwise, the accumulated e-liquid would undergo deterioration due to a long time exposure and a re-condensation for adsorption of impurities. Therefore, atomizing an accumulated e-liquid to produce smoke would affect tastes of smokers.

The second kind is: the microprocessor control module 42 controls the battery rod assembly 1 to supply an electrical power to the heating assembly 3 and the atomization assembly 2 at the same time, a sum of output power of the atomization assembly 2 and the heating assembly 3 is equal to output power of the atomization assembly 2 when individually working. By this means, the e-liquid is fully utilized, and the smoke is kept steady and user experience is improved.

Wherein, concrete values of the default value are related to specific types of the smoking switch. For example, when the smoking switch 41 is an airflow sensor, the default value can be set as a relatively large number, such as 60.

In the case of the smoking switch 41 is a key switch or touch switch, because actual smoking times after triggering the key switch or touch switch are not sure, but for this kind of electronic cigarettes, mostly triggering times of the key switch or touch switch are a few, so the default value can be set as a relatively small number, such as 10. For the two kinds of switches, preferably can count as: start to time when counting, if the time from a trigger button is triggered last time to this time is less than the default time, then this triggering is not in the count, only when the timing time is greater than or equal to the default time, to count accumulatively, such as the default time can be set as 10 minutes.

Figure 2:
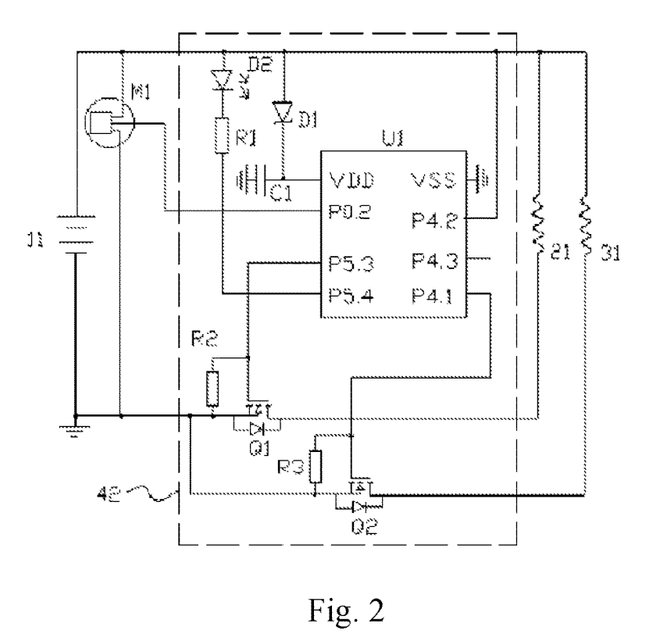
FIG. 2 is a circuit diagram of an electronic cigarette provided with an accumulated e-liquid removal function in the first embodiment.

Specifically, FIG. 2 is a circuit diagram of an electronic cigarette provided with an accumulated e-liquid removal function in the first embodiment.

The smoking switch 41 is an airflow sensor M1, the battery rod assembly 1 comprises a battery 11, the atomization assembly 2 comprises a first electric wire 21, the heating assembly 3 comprises a second electric wire 31.

The microprocessor control module 42 comprises a SN8P2711B type microcontroller U1, a first MOS transistor Q1 which is N typer and is used for controlling an electric connection between the first electric wire 21 and the battery 11, a second MOS transistor Q2 which is N typer and is used for controlling the electric connection between the second electric wire 31 and the battery 11, a zener diode D1, a capacitance C1 and a light-emitting diode D2 used for smoking indication.

A VDD pin of the microcontroller U1 is connected to a negative electrode of the zener diode D1, a positive electrode of the zener diode D1 is connected to a positive electrode of the battery 11, the VDD pin of the microcontroller U1 is also connected to a negative electrode of the battery 11 through the capacitance C1, a positive electrode of the light-emitting diode D2 is connected to the positive electrode of the battery 11, a negative electrode of the light-emitting diode D2 is connected to a P5.4 pin of the microcontroller U1; a VSS pin of the microcontroller U1 is connected to the positive electrode of the battery 11, a positive electrode and a negative electrode of the airflow sensor M1 are correspondingly connected to the positive electrode and negative electrode of the battery 11, a signal output end of the airflow sensor M1 is connected to a P0.2 pin of the microcontroller U1, the two ends of the first electric wire 21 are connected to the positive electrode of the battery 11 and a drain electrode of the first MOS transistor Q1 respectively, the two ends of the second electric wire 31 are connected to the positive electrode of the battery 11 and a drain electrode of the second MOS transistor Q2 respectively, both source electrodes of the first MOS transistor Q1 and the second MOS transistor Q2 are connected to the negative electrode of the battery 11, the grid electrodes of the first MOS transistor Q1 and the second MOS transistor Q2 are connected to a P5.3 pin and a P4.1 pin of the microcontroller U1 respectively and correspondingly, a first bias resistance R2 is connected between the source electrode and grid electrode of the first MOS transistor Q1, a second bias resistance R3 is connected between the source electrode and grid electrode of the second MOS transistor Q2.

The working process is as follows:

Under normal circumstances, the P5.3 pin and P4.1 pin output low level, P5.4 output high level, the first MOS transistor Q1, the second MOS transistor Q2 and the light-emitting diode D2 are cut-off, the light-emitting diode D2 is not emitting light, the first electric wire 21 and the second electric wire 31 are in operation.

If the air airflow sensor M1 senses the air, an electrical signal is outputted as a trigger signal, the P0.2 pin of the microcontroller U1 receives the electrical signal, on one hand, the P5.4 pin outputs a low level, the light-emitting diode D2 is conducted to emit light to indicate the smoking status, on the other hand, the P5.3 pin outputs a high level, the first MOS transistor Q1 is conducted, the battery rod assembly 1 supplies power for the first electric wire 21, after a certain period of time of the atomizing e-liquid producing smoke for sucking, the P5.3 pin returns to output a low level to stop atomizing, meanwhile, the count of smoking of the microcontroller U1 plus one, and the microcontroller U1 decides whether if the smoking times reaches the default value, if so, resets the count, and the P4.1 pin outputs a high level, the second MOS transistor Q2 is conducted, the battery rod assembly 1 supplies power for the second electric wire 31, the condensed or leaked e-liquid is atomized again, after the default time, the P4.1 pin outputs a low level, the battery rod assembly 1 disconnects the power supplied to the second electric wire 31, if not, the P4.1 pin keeps outputting the low level, the second MOS transistor Q2 is cut-off.

Wherein, the capacitor C1 is used to supply working voltage for the microcontroller U1 in an outage emergency, if the power supply is cut off, such as to dig out the battery 11, then a power input of the VDD pin through the zener diode D1 is disconnected, due to a discharge of the capacitor C1, the VDD pin does not immediately lose power, which gives a buffer time for the microcontroller U1.

It need be noticed that, all the choices of the chips, the pins and the models of MOS transistor are just examples, and are not qualified, any replacement of components that can realize the function above-mentioned should belong to the protection of present invention.

Figure 3:
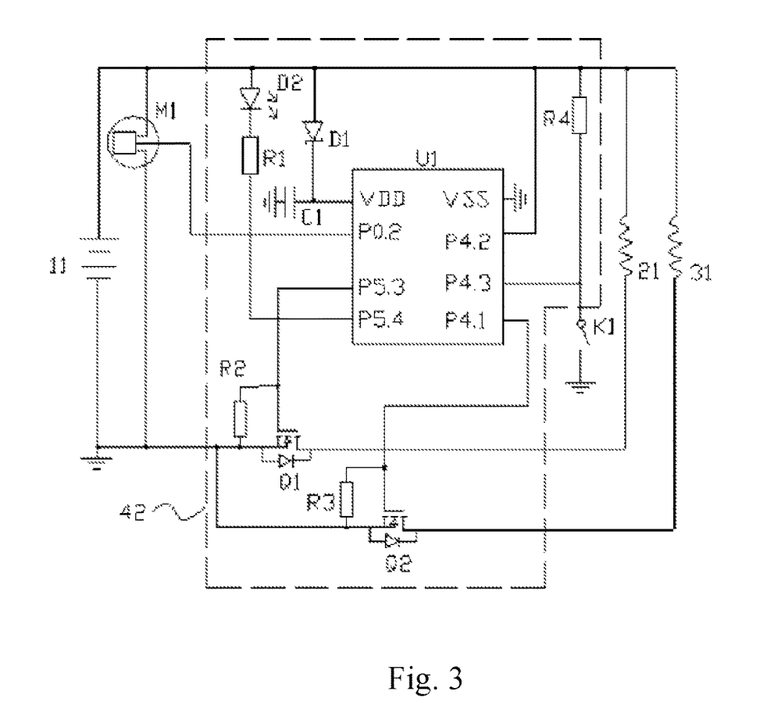
FIG. 3 is a circuit diagram of an electronic cigarette provided with an accumulated e-liquid removal function in a second embodiment.

For reference, FIG. 3 is a circuit diagram of an electronic cigarette provided with an accumulated e-liquid removal function in a second embodiment.

In the first embodiment, the control assembly 4 is fully automatic, in the second embodiment, the control assembly 4 is automatic or optional manual.

In the second embodiment, the control assembly 4 also comprises a first switch K1 electrically connected to the microprocessor control module 42. The microprocessor control module 42 also used for controlling the battery rod assembly 1 to supply power to the heating assembly 3 and reset the smoking times when the first switch K1 was triggered. In this embodiment, the first switch K1 is a spring back switch.

Specifically, differences from the circuit of the first embodiment is that the P4.3 pin of the microcontroller U1 is connected to the negative electrode of the battery 11 through the first switch K1, the P4.3 pin of the microcontroller U1 is also connected to the positive electrode of the battery 11 through a pull-up resistor R4.

The working principle of an automatic control refers to the first embodiment parts above, the difference is that the function of the removal of e-liquid can be started manually at any time: under normal circumstances, the P4.3 pin receives the high level, at any time, if press the first switch K1 manually, then the P4.3 pin of the microcontroller U1 is connected to the ground, so the microcontroller U1 immediately perform actions of removing the accumulated e-liquid, the P4.1 pin outputs the high level, the subsequent principle refers to the first embodiment.

Figure 4:
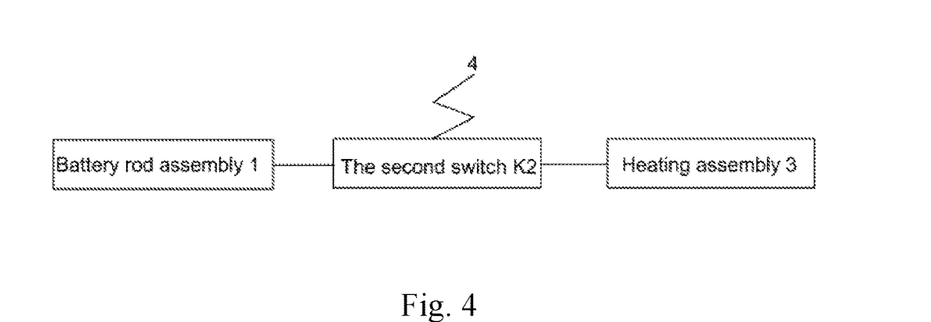
FIG. 4 is a principle diagram of an electronic cigarette provided with an accumulated e-liquid removal function in a third embodiment.
Figure 5:
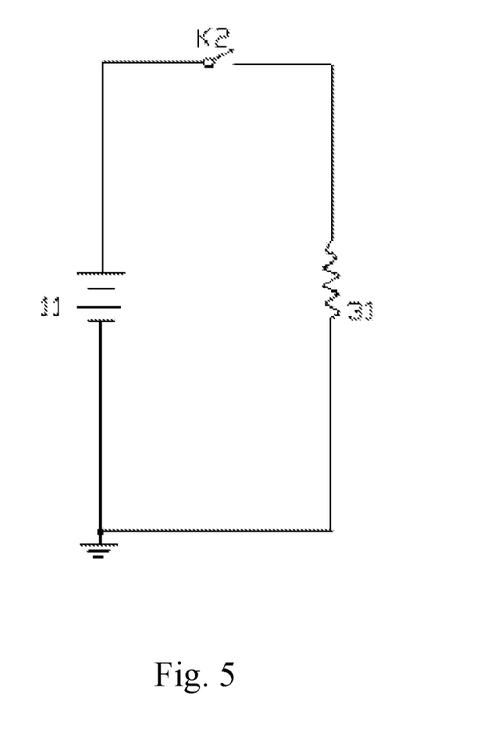
FIG. 5 is a circuit diagram of an electronic cigarette provided with an accumulated e-liquid removal function in the third embodiment.

For reference, FIG. 4 is a principle diagram of an electronic cigarette provided with an accumulated e-liquid removal function of a third embodiment of the present application, FIG. 5 is a circuit diagram of an electronic cigarette provided with an accumulated e-liquid removal function of the third embodiment of the present application.

In the third embodiment, the control assembly 4 belongs to a full manual control. The control assembly 4 is a second switch K2, the second electric wire 31 is connected to the battery 11 through the second switch K2, in this embodiment, the second switch K2 is a press switch. In this condition, the control of the battery rod assembly 1 supplying power for atomization assembly 2 can be realized by controlling the controller or switch, which is existing technology, and is no longer repeated here.

When it is need to remove the accumulated e-liquid, the user directly presses on the second switch K2, after removing then presses the second switch K2 to stop atomization. Certainly, this embodiment just provides a way to realize a manual control of the removal of e-liquid. In fact, generally electronic cigarettes have a controller, so only need to design a switch which can give a trigger signal to the controller, that is a manual trigger of the controller to realize re-atomizing, it is also equivalent to cancel the function of automatic control counting of the microcontroller U1 in the second embodiment.

Figure 6:
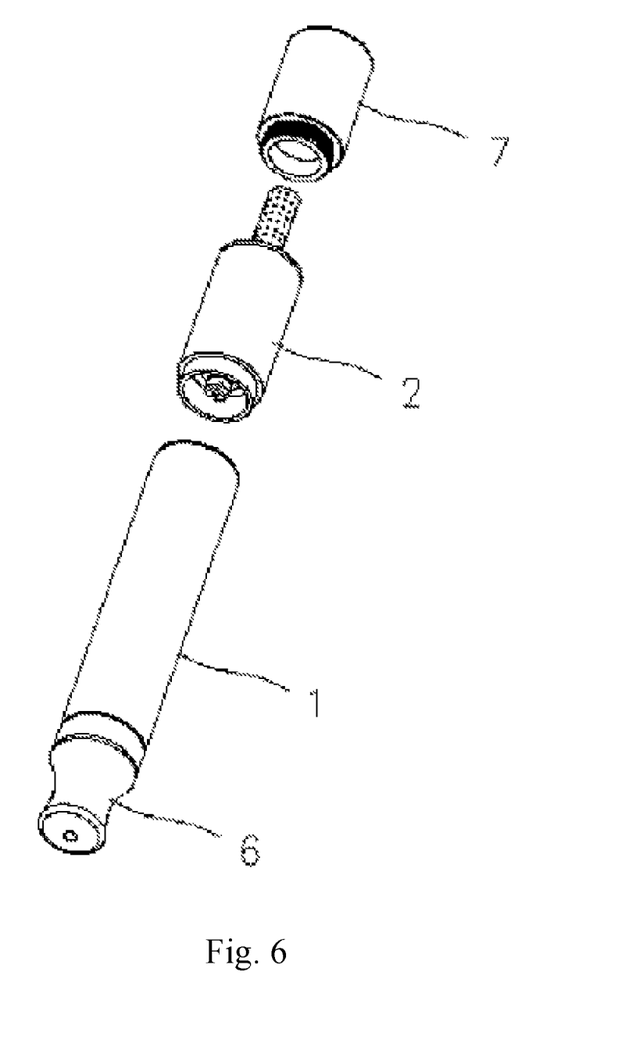
FIG. 6 is an exploded view of an electronic cigarette provided with an accumulated e-liquid removal function.

In order to facilitate the removal of e-liquid, preferably set the heating assembly 3 in the smoke channel where is easy to accumulate e-liquid, or near the smoking end. For reference, FIG. 6 is an exploded view of an electronic cigarette provided with an accumulated e-liquid removal function of the present application.

The electronic cigarette comprises successively detachable connection of the battery rod assembly 1, the atomization assembly 2 and an e-liquid reservoir 7, and the electronic cigarette comprises a smoking end 6, the smoking end 6 is detachably connected to the battery rod assembly 1.

The e-liquid reservoir 7 is arranged on the end away from the smoking end 6 of the electronic cigarette, because of the e-liquid reservoir 7 is arranged on the suction nozzle section in the prior art, different oral clamping forces result in different amounts of e-liquid outputting when smoking, the present invention overcomes the above shortcomings, a stability of the smoke volume is improved, it is not easy to leak e-liquid, and will not exist problems of bending deformation to crack and leakage at the connection parts between the e-liquid reservoir 7 and the electronic cigarette body which is caused by the gravity of the electronic cigarette, and overcomes the defect of that the users' oral is easy to inhale e-liquid.

To make a whole structure of the electronic cigarette to imitate the real cigarette and conform to the user's habits, and at the same time in consideration of the simple and unobstructed of shape of the smoke channel, the atomization assembly 2 and the battery rod assembly 1 can be arranged coaxially, the atomization assembly 2 and the battery rod assembly 1 can be arranged non-coaxially, for instance, with a method that the e-liquid reservoir 7 and the atomization assembly 2 are arranged parallelly, so the e-liquid reservoir 7 and the atomization assembly 2 are connected to the battery rod 1 respectively, which makes the whole structure of the electronic cigarette is a T shape, or arrange the e-liquid reservoir 7 at a side of the atomization assembly 2 to form a L shape electronic cigarette.

That is, in this embodiment, the whole shape structure of the electronic cigarettes is not limited, as long as the e-liquid reservoir 7 is arranged away from the smoking end 6. Preferably, the e-liquid reservoir 7 is detachably connected to the atomization assembly 2, the atomization assembly 2 is detachably connected to the battery rod assembly 1, so as to overcome a defect of scalding a mouth, which caused by that the atomization assembly 2 is arranged at the middle-upper section of the electronic cigarette, near to the mouth and the smoke temperature is high in the prior art. Due to the smoke channel is not necessary to go through the e-liquid reservoir 7, a probability of condensation of smoke caused by the e-liquid in the e-liquid reservoir 7 absorbing heat is reduced.

Certainly, the arrangement of smoking end 6 is not limited in this embodiment, the smoking end 6 can be arranged at an outside of the end of the battery rod assembly 1, or the smoking end 6 is at the middle of the battery rod assembly 1, or the smoking end 6 is on a position of the battery rod assembly 1 which is opposite to the atomization assembly 2. For instance, the battery rod assembly 1, the atomization assembly 2 and the e-liquid reservoir 7 which are connected successively can be arranged crisscross, to make the appearance of the electronic cigarette abnormity, a specific shape of the abnormity can be arbitrary shape.

Figure 7:
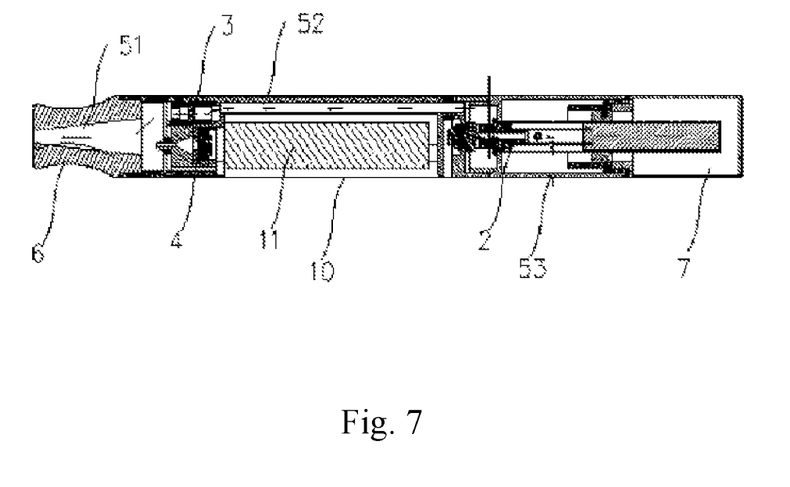
FIG. 7 is a schematic view of profile structure of an electronic cigarette provided with an accumulated e-liquid removal function in the first embodiment.
Figure 10:
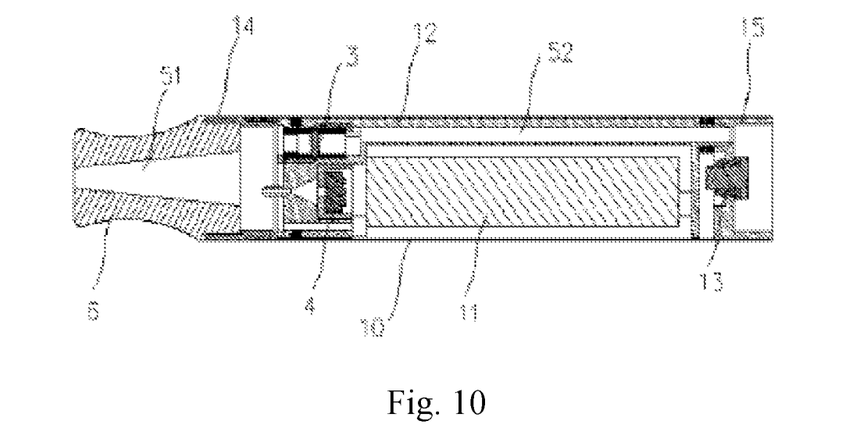
FIG. 10 is a structural schematic view of the battery rod assembly shown in FIG. 7.
Figure 11:
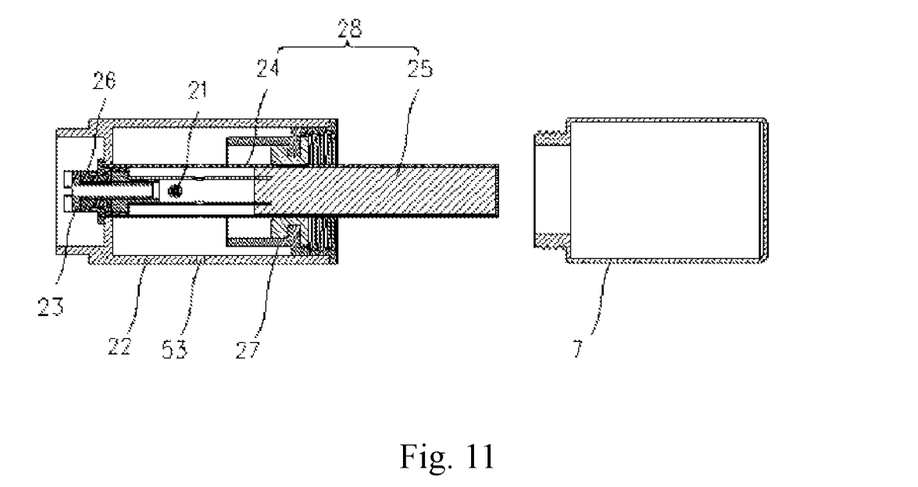
FIG. 11 is a detached structural schematic diagram of the atomization assembly and the e-liquid reservoir shown in FIG. 7.

With respect to a specific structure of the electronic cigarette, refer to FIG. 7, FIG. 10 and FIG. 11:

The smoking end 6 is a suction nozzle which is detachably connected to the battery rod assembly 1, a first channel 51 is arranged axially in the suction nozzle.

The battery rod assembly 1 comprises: a battery sleeve 10, a battery 11, a battery holder 12 used to fasten the battery 11, a battery electrode 13 which is electrically connected to the battery 11, a first connector 14 and a second connector 15.

The atomization assembly 2 comprises: the first electric wire 21, a atomizing holder 22 used to fasten the first electric wire 21, a atomizing electrode 23 which is connected to the battery electrode 13 and the first electric wire 21, an insulator ring 26, a third connector 27 and a e-liquid guided component 28. In this embodiment, the e-liquid guided component 28 comprises an atomizing sleeve 24 and an e-liquid storage cotton 25.

Combine with FIG. 7 and FIG. 10, wherein, the battery sleeve 10, the first connector 14, the second connector 15 and the battery holder 12 are cylindrical. The battery holder 12 comprises a battery installing groove arranged axially, a first channel 51 and a second channel 52 which are arranged axially and go through the battery holder. The battery 11 is mounted in the battery installing groove, the battery sleeve is arranged outside the battery holder 12, and a second inlet port which communicates the battery installing groove and the outside is arranged on a section of the battery sleeve 10 corresponding to the battery installing groove. The first connector 14 and the second connector 15 are mounted coaxially on two ends of the battery sleeve 10 respectively, the first connector 14 is interference fitted with the suction nozzle, the battery electrode 13 is firmly embedded in the second connector 15 by interference fitting, and emerges from the second connector 15, a control assembly installing groove is arranged on a sidewall of the battery installing groove towards the suction nozzle, the microprocessor control module 42 and the airflow sensor M1 are integrated as a control assembly 4 arranged in the control assembly installing groove, a first connecting through-hole connects to the first channel 51 is arranged on a bottom of the control assembly installing groove. The inlet port 53, the battery installing groove, the control assembly installing groove, the first connecting through-hole and the first channel 51 form the flow channel. The flow channel is divided into two parts by the control assembly 4, when smoking, one part of the flow channel at the control assembly 4 towards the suction nozzle has a negative pressure, the other part at the control assembly 4 towards a side of the battery 11 is connected with the outside, the pressure is constant, then there is a pressure difference between the two sides of the airflow sensor M1, and triggering the airflow sensor M1.

Combine with FIG. 7 and FIG. 11, the atomizing holder 22 is cylindrical, with an atomizing chamber, the third connector 27 is mounted on an end of the atomizing holder coaxially, and an internal thread is arranged on an inside surface of the third connector 27. In this embodiment, the e-liquid reservoir 7 is an e-liquid storage bottle, an external thread is arranged on an outer wall of the bottleneck of the e-liquid storage bottle corresponding to the internal thread, to make the e-liquid reservoir 7 spin on the atomization assembly 2. The other end of the atomizing holder 22 is inserted to the second connector 15, a third connecting through-hole is arranged in the second connector 15 to communicate the second channel 52 and an inside space of the atomizing holder 22. The atomizing electrode 23 is cylindrical, a second connecting through-hole is arranged on the center of the atomizing electrode axially to guide the air into the electronic cigarette when smoking, the insulator ring 26 is firmly arranged outside one side of the atomizing electrode 23, the insulator ring 26 is firmly embedded in the atomizing holder 22 by interference fitting, one end of the atomizing electrode 23 stretches into the atomizing chamber, the other end is opposite to the battery electrode 13, the first electric wire 21 is axially arranged in the atomizing chamber, the first electric wire 21 is electrically connected to the atomizing electrode 23 by electric wires or a direct contact, an end of the first electric wire 21 which is opposite to the atomizing electrode 23 is wrapped with the e-liquid storage cotton 25, the first electric wire 21 and the e-liquid storage cotton 25 is arranged together in the atomizing sleeve 24. The atomizing sleeve 24 goes through the third connector axially and stretches into the e-liquid storage bottle. A first inlet port 53 is arranged on an outside wall of the atomizing holder 22, a forth connecting through-hole is arranged on the atomizing sleeve 24 at the section of atomizing chamber. In this embodiment, the smoke channel comprises: the first inlet port 53, the atomizing chamber, the forth connecting through-hole, an inside of the atomizing sleeve 24, the second connecting through-hole, a gap between the atomizing electrode 23 and the battery electrode 13, the third connecting through-hole, the second channel 52 and the first channel 51. When smoking, the first electric wire 21 is power on and heating, then the e-liquid guided by the e-liquid storage cotton 25 is atomized to produce smoke, the air flows through the smoke channel and into the mouth of the user.

It is need to be noticed that, arrangements of the first inlet port 53 and the second inlet port are explained only for example, not limited, as long as the first inlet port is connected to the smoking end 6 through the smoke channel and the second inlet port is connected to the smoking end 6 through the flow channel.

As when removing the accumulated e-liquid, the user generally no longer breathe from the smoking end, in order to guarantee the smoke atomized from the accumulated e-liquid by the heating assembly 3 to be exhausted from the smoke channel, preferably, a fan used to exhaust the smoke from the smoke channel is arranged in the smoke channel. The fan is connected to the control assembly 4 by a small motor, the control assembly 4 is also used to control the motor to drive the fan when controls the heating assembly 3. A specific installation position is not limited, as long as set in the smoke channel, no detailed description here.

When smoking, an airflow triggers the airflow sensor M1 in the flow channel, the microcontroller U1 counts according to the triggering times of the airflow sensor M1, and controls the first electric wire 21 heating and atomizing to produce the smoke for sucking, the smoke flows through the smoke channel to the mouth of the user. If the smoking time reaches the default value, then controls the second electric wire 31 heating and atomizing the accumulated e-liquid in the smoke channel.

The heating assembly 3 can be arranged at any position in the smoke channel, preferably, in this embodiment the heating assembly 3 is arranged in the smoke channel which is opposite to the first electric wire 21, because the first electric wire 21 usually generates heat, it will not accumulate e-liquid nearby, the condensated e-liquid mainly is formed after the smoke flowing a distance or the leaked e-liquid is sucked to here.

Figure 8:
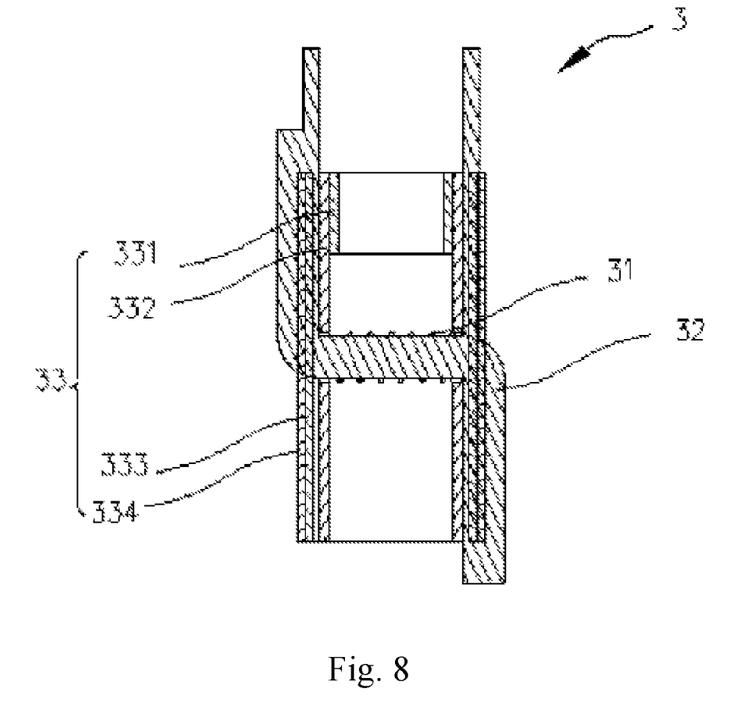
FIG. 8 is a structural schematic view of the heating assembly shown in FIG. 7.
Figure 9:
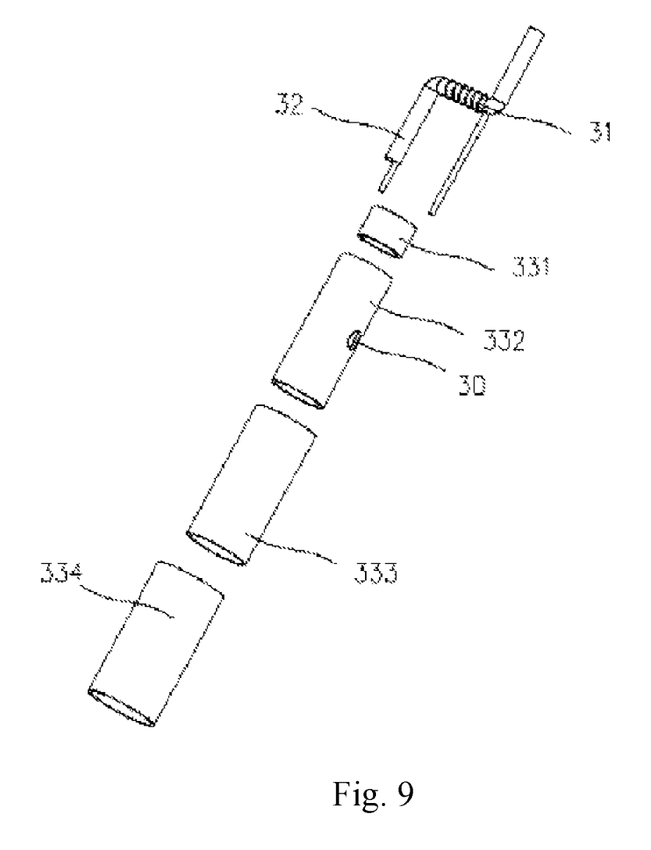
FIG. 9 is an exploded view of the heating assembly shown in FIG. 8.

A detailed description of a structure of the heating assembly 3 is as following, FIG. 8 is a structural schematic diagram of the heating assembly in FIG. 7, FIG. 9 is an exploded view of the heating assembly in FIG. 8.

The heating assembly 3 comprises a liquid guiding rope 32, a second electric wire 31 twined round the liquid guiding rope, a ventilating pipe component 33 used for fixing the liquid guiding rope 32.

Specifically, the ventilating pipe component 33 comprises a first ventilating pipe 332 used for fixing the liquid guiding rope 32, the first ventilating pipe 332 is provided with at least two mounting holes 30 used for the liquid guiding rope 32 to be arranged through. In this embodiment, the two mounting holes 30 are symmetrically arranged. The liquid guiding rope 32 is arranged through the two mounting holes 30 in proper sequence. The second electric wire 31 twinning round the liquid guiding rope 32 is on an outer surface of an internal region of the first ventilating pipe 332.

The ventilating pipe component 33 further comprises a second ventilating pipe 331 used for avoiding an e-liquid adhesion, a third ventilating pipe 333 and a fixed pipe 334. The second ventilating pipe 331 is sheathed in one end of the first ventilating pipe 332, the third ventilating pipe 333 and the fixed pipe 334 are sheathed outside the first ventilating pipe 332 in sequence.

The heating assembly 3 is provided in the smoke channel and is fixed along the direction of smoke flowing. It means the smoke flows through an internal of the first ventilating pipe 332 along an axial direction of the first ventilating pipe 332. The liquid guiding rope 32 can effectively absorb the accumulated e-liquid at this section for facilitating re-atomizing, thus to facilitate a re-atomization. The first ventilating pipe 332 will not affect the smoke flowing through. The heating assembly 3 provided in the smoke channel should not affect the smoke flowing through, thus the heating assembly 3 is arranged at a position of the smoke channel which has a relative large amount of airflow, and is preferred to close to the smoking end 6. Preferably, the heating assembly 3 is arranged at the joint of the first channel 51 and the second channel 52.

In the first embodiment, the first channel 51 is a conical hole, of which the aperture increases gradually towards the direction of the battery 11. The second channel 52 comprises: a first cylindrical hole close to the smoking end, a second cylindrical hole with an aperture less than that of the first cylindrical hole. The heating assembly 3 is fixed in the first cylindrical hole.

Figure 12:
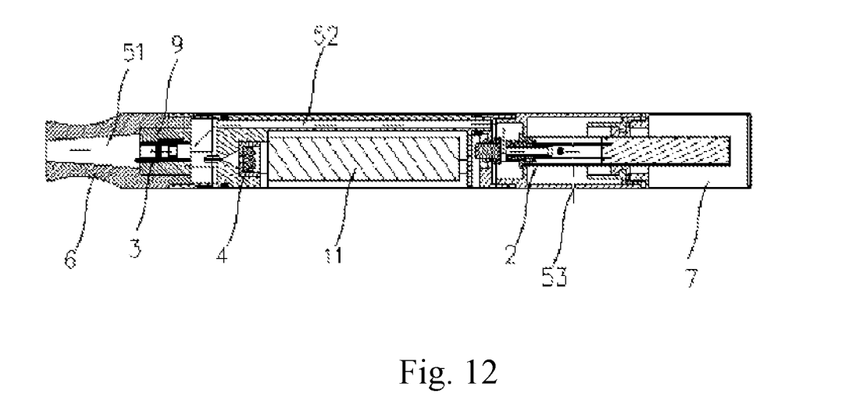
FIG. 12 is a schematic diagram of profile structure of an electronic cigarette provided with an accumulated e-liquid removal function in the second embodiment.

FIG. 12 is a schematic diagram of profile structure of an electronic cigarette provided with an accumulated e-liquid removal function of a second embodiment of the present application;

In the second embodiment, a fixing piece 9 set with bores throughout the axial direction is used for fixing the heating assembly 3, the heating assembly 3 is inserted into the bores by means of interference fit. The first channel 51 comprises conical holes and a mounting groove matched with the fixing piece 9. The fixing piece 9 is inserted into the mounting groove of suction nozzle by means of interference fit. The second channel 52 is a cylindrical hole throughout the axial direction of bracket 12.

In both of the two embodiments, the heating assembly 3 is fixed at a turning point of the smoke channel. The second channel 52 is smooth running, thus it is rare for e-liquid to be accumulated. It is even rarer for e-liquid to be accumulated in the section close to the first electric wire 21 due to the heat frequently produced by the first electric wire 21. Therefore, it is in the outlet section of the second channel 52 in the first embodiment, and in the intlet section of the first channel 51 in the second embodiment, in both of the two embodiments, the heating assembly 3 is fixed at the joint of the first channel 51 and the second channel 52. By setting the heating assembly at this place, it is not only be impossible to affect smoke flowing through, but also achieving the most significant effect of removing the accumulated e-liquid, because the e-liquid is most tended be accumulated at this place.

The present invention further discloses a method applied in the electronic cigarette for removal of accumulated e-liquid. The electronic cigarette comprises an atomization assembly 2 used for atomizing an e-liquid to produce smoke and a battery rod assembly 1 used for supplying power to the atomization assembly 2. The electronic cigarette refers to the electronic cigarette provided with an accumulated e-liquid removal function in the present invention. The electronic cigarette is provided with the smoke channel for smoke to flow through. The method comprises providing a heating assembly 3 in the smoke channel to re-atomize non-atomized e-liquid accumulated in the smoke channel by controlling the heating assembly 3 to generate heat via the control assembly 4.

The method further comprises:

A fan is further provided in the smoke channel. The control assembly 4 is further used for controlling the fan to work when controlling the heating assembly 3, so as to discharge smoke out of the smoke channel.

In the first embodiment, the control assembly 4 comprises a smoking switch 41 and a microprocessor control module 42. The microprocessor control module 42 comprises a control unit, a setting unit, a memory cell, a counting unit, and a comparing unit.

The steps controlling the heating assembly 3 to produce heat are as following:

S0, the smoking switch 41 sends an inhalation signal;

S1, the control unit receives the inhalation signal and controls the battery rod assembly 1 supplying power to the atomization assembly 2, meanwhile, the counting unit extracts a value of smoking times from the memory cell and make the value of smoking times plus one. Subsequently, the value which is made to plus one is stored in the memory cell.

S2, the comparing unit determines whether the smoking times reach the default value, if yes, the control unit controls the battery rod assembly to supply power to the heating assembly, at the same time resets the smoking times. After a presetting time, the control unit controls the battery rod assembly to stop supplying power for the heating assembly. If no, waiting for step S0.

In the first embodiment, the method further comprises: executing step S0a before step S0a, S0a: the setting unit sets the default values of the preset time and the smoking time, and stores the default values of the preset time and the smoking time in the memory cell, specifically comprises:

Preset time setting: the preset time in the step S2 should guarantee a completed atomization of the e-liquid. A too short time will not guarantee a full atomization, a too long time will cause the heating assembly 3 to burn itself, which will damage internal components of the electronic cigarette. The default factory value of the preset time can be set according to a specific type of electronic cigarette. With the setting unit, the preset time can be reset by the user and stored in the memory cell. On the hardware, the setting can be realized as follows: one pin of the microcontroller U1 is connected to a time setting switch. With an extended press of the time setting switch, the time setting begins. Select the default value as the presetting time, such as 5 s. With every press of the time setting switch, a fixed value is increased, such as 5 s. After that, long press the time setting switch to finish the time setting and store the value of preset time. If the time setting switch is not long pressed for a certain interval since the last long press, the setting is canceled.

The default value of smoking times setting: reset the default value of smoking times with the setting unit, and store it in the memory cell. Similarly, on the hardware, the setting can be realized as follows: for example, when the electronic cigarette is equipped with an airflow sensor, the factory default value is set as 60. Increase a switch for smoking times setting, if users need to set a new default value, long press the smoking times setting switch and enter into the default value setting. The default value is default 60, with every press of the smoking times setting switch, a fixed value is increased, such as 10 (Absolutely, two switches can be provided, one is used for decreasing the default value, the other one is used for increasing the default value). After that, long press the smoking times setting switch to finish the setting and store the default value. If the smoking times setting switch is not long pressed for a certain interval since the last long press, the setting is canceled.

Preferably, when the smoking times reach the default value in step S2, there are two controlling methods:

The first kind is: firstly control the battery rod assembly to supply power to the atomization assembly 2, and when finishing that, control the battery rod assembly to supply power to the heating assembly 3. It is prior for the smokers to inhale the smoke, the accumulated e-liquid is only atomized when the smokers finish their inhalation. Otherwise, the accumulated e-liquid would undergo deterioration due to a long time exposure and a re-condensation for an adsorption of impuritie, thus, atomizing an accumulated e-liquid to produce smoke would affect tastes of smokers.

The second kind is: control the battery rod assembly 1 to supply power to the heating assembly 3 and the atomization assembly 2 together, the sum of the output power of the atomization assembly 2 and the heating assembly 3 is equal to the output power of the atomization assembly 2 when individually working. By doing this, the e-liquid is fully utilized, and the smoke is kept steady and user experience is improved.

At any moment, when a manual removal of e-liquid is needed, manually trigger the first switch K1 of the electronic cigarette so that the control unit of the microprocessor control module 42 controls the battery rod assembly 1 to supply power to the heating assembly 3 and resets the smoking times stored in the memory cell.

Wherein, the concrete values of the default value are related to a specific type of the smoking switch. For example, when the smoking switch 41 is an airflow sensor, the default value can be set as a relatively large number, such as 60.

When the smoking switch 41 is a key switch or a touch switch, the default value can be set as a relatively small value such as 10, because actual smoking times after triggering the key switch or touch switch are not sure, but for this kind of the electronic cigarette, basically, a low frequency of triggering the key switch or the touch switch at every interval of smoking is a few. Preferably, the times counting can be realized by following: at every counting, when timing begins, if the time of triggering the touch switch since last triggering is less than the preset time, this triggering is not included in counts. Only if the timekeeping time is greater than or equal to the preset time can the counts be accumulated. For example, the preset time can be set as 10 minutes.

If the control assembly 4 is a second switch K2, the heating assembly 3 is electrically connected with the battery 11 inside the battery rod assembly 1 through the second switch K2.

The method can be specified as: when manual removal of accumulated e-liquid is needed, the user turns on the second switch K2 of the electronic cigarette so that the heating assembly 3 is electrically connected to the inner battery 11 of the battery rod assembly 1 through the second switch K2, and then the atomizing of the accumulated e-liquid begins. With finishing removing accumulated e-liquid, the heating assembly 3 is stopped atomizing when the user turns off the second switch K2.

As above mentioned, the present invention provides a heating assembly in the smoke channel and controls the heating assembly via a control assembly to produce heat to allow e-liquid accumulated in the smoke channel to be re-atomized, thereby achieving the object of removal of the accumulated e-liquid While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

What is claimed is:

1. An electronic cigarette provided with an accumulated e-liquid removal function, comprising an atomization assembly (2) configured for atomizing an e-liquid to produce smoke and a battery rod assembly (1) configured for supplying power to the atomization assembly (2), the electronic cigarette is provided with a smoke channel for smoke to flow through, wherein the electronic cigarette further comprises:
 a heating assembly (3) provided in the smoke channel and controlled by a control assembly (4) to produce heat to allow e-liquid accumulated in the smoke channel to be re-atomized;
 wherein the control assembly (4) comprises:
 a smoking switch (41) is configured for sending an inhalation signal;
 a microprocessor control module (42) is configured for receiving the inhalation signal and controlling the battery rod assembly (1) to supply power to the atomization assembly (2);
 the microprocessor control module (42) is further configured for counting smoking times based on the inhalation signal and controlling the battery rod assembly (1) to supply power to the heating assembly (3) when the smoking times reach a default value, at the same time resetting the smoking times;
 the atomization assembly (2) comprises a first electric wire (21), the heating assembly (3) comprises a second electric wire (31).

2. The electronic cigarette provided with an accumulated e-liquid removal function according to claim 1, wherein the control assembly (4) further comprises a first switch (K1) electrically connected to the microprocessor control module (42);
 the microprocessor control module(42) is further configured for controlling the battery rod assembly (1) charging for the heating assembly (3) and resetting the smoking times when the first switch(K1) was triggered.

3. The electronic cigarette provided with an accumulated e-liquid removal function according to claim 1, wherein the smoking switch (41) comprises an airflow sensor, a key switch or a touch switch.

4. The electronic cigarette provided with an accumulated e-liquid removal function according to claim 1, wherein the smoking switch (41) is an airflow sensor (M1), the battery rod assembly (1) comprises a battery (11);
 the microprocessor control module (42) comprises a microcontroller (U1) whose type is SN8P2711B, a first MOS transistor (Q1) configured for controlling an electrical connection between the first electric wire (21) and the battery (11), a second MOS transistor (Q2) configured for controlling an electrical connection between the second electric wire (31) and the battery (11), and a zener diode (D1);a VDD pin of the microcontroller (U1) is electrically connected to a negative electrode of the zener diode (D1), and a positive electrode of the zener diode (D1) is electrically connected to a positive electrode of the battery (11), a signal output end of the airflow sensor (M1) is electrically connected to a P0.2 pin of the microcontroller (U1), two ends of the first electric wire (21) are electrically connected to the positive electrode of the battery (11) and a drain electrode of the first MOS transistor (Q1) respectively, two ends of the second electric wire (31) are electrically connected to the positive electrode of the battery (11) and a drain electrode of the second MOS transistor (Q2) respectively, both source electrodes of the first MOS transistor (Q1) and the second MOS transistor (Q2) are electrically connected to a negative electrode of the battery (11), grid electrodes of the first MOS transistor (Q1) and the second MOS transistor (Q2) are connected to a P5.3 pin and a P4.1 pin of the microcontroller (U1), respectively.

5. The electronic cigarette provided with an accumulated e-liquid removal function according to claim 4, wherein the microprocessor control module (42) further comprises a capacitance (C1), a resistance (R1) and a light-emitting diode (D2) configured for smoking indication;
 a VSS pin of the microcontroller (U1) is further grounded through the capacitance (C1), a positive electrode of the light-emitting diode (D2) is electrically connected to the positive electrode of the battery (11), a negative electrode of the light-emitting diode (D2) is electrically connected to a P5.4 pin of the microcontroller (U1) through the resistance (R1);
 the microcontroller (U1) is configured for controlling a conducting of the light-emitting diode (D2) to light when receiving a triggering electrical signal, the capacitance (C1) is configured for supplying a working voltage to the microcontroller (U1) with an emergency power off.

6. The electronic cigarette provided with an accumulated e-liquid removal function according to claim 1, wherein the heating assembly (3) comprises:
   a liquid guiding rope (32);
   the second electric wire (31) twined round an outside surface of the liquid guiding rope (32);
   a ventilating pipe component (33) configured for fixed the liquid guiding rope (32).

7. The electronic cigarette provided with an accumulated e-liquid removal function according to claim 6, wherein the ventilating pipe component (33) comprises a first ventilating pipe (332) configured for fixing the liquid guiding rope (32), the first ventilating pipe (332) is defined with at least two mounting holes (30) configured for allowing the liquid guiding rope (32) to pass through.

8. The electronic cigarette provided with an accumulated e-liquid removal function according to claim 7, wherein the ventilating pipe component (33) further comprises:
   a second ventilating pipe (331) defined at one end of the first ventilating pipe (332) and configured for avoiding an e-liquid adhesion,
   a third ventilating pipe (333) and a fixed pipe (334) defined outside the first ventilating pipe (332) in sequence.

9. The electronic cigarette provided with an accumulated e-liquid removal function according to claim 1, wherein the electronic cigarette further comprises an e-liquid reservoir (7) configured for accommodating the e-liquid, the electronic cigarette is provided with a smoking end (6), the e-liquid reservoir (7) is provided at an end opposite to the smoking end (6).

10. The electronic cigarette provided with an accumulated e-liquid removal function according to claim 9, wherein the smoking end (6) is a suction nozzle detachably connected to the battery rod assembly (1), the smoke channel comprises:
    a first inlet port (53) arranged on an outer surface of the electronic cigarette,
    a first channel (51) arranged in the suction nozzle;
    a second channel (52) arranged in the battery rod assembly (1) and communicated with the first inlet port (53) and the first channel (51),
    wherein, the heating assembly (3) is arranged at a joint of the first channel (51) and the second channel (52).

11. The electronic cigarette provided with an accumulated e-liquid removal function according to claim 9, wherein the atomization assembly (2) is defined with the battery rod assembly (1) coaxially, the e-liquid reservoir (7) is detachably connected to the atomization assembly (2),
    and/or,
    the atomization assembly (2) is detachably connected to the battery rod assembly (1).

12. A method of removing accumulated e-liquid in an electronic cigarette, used for the electronic cigarette, the electronic cigarette comprises an atomization assembly (2) configured for atomizing an e-liquid to produce smoke and a battery rod assembly (1) configured for supplying power to the atomization assembly (2), the electronic cigarette is provided with a smoke channel for smoke to flow through, wherein the method comprises providing a heating assembly (3) in the smoke channel to re-atomize non-atomized e-liquid accumulated in the smoke channel by controlling working of the heating assembly (3);
    wherein a method controlling the heating assembly (3) to generate heat comprises the following steps:
    S0, a smoking switch (41) sends an inhalation signal;
    S1, a microprocessor control module (42) receives the inhalation signal and controls the battery rod assembly (1) to supply power to the atomization assembly (2), at the same time, the microprocessor control module (42) plus one to smoking times;
    S2, the microprocessor control module (42) determines whether the smoking times reach a default value, if yes, controls the battery rod assembly (1) to supply power to the heating assembly (3), at the same time resets the smoking times, if no, then waits for the step S0.

13. The method of removing accumulated e-liquid in electronic cigarette according to claim 12, wherein the method further comprises:
    when a manual removal of the e-liquid is needed, at any moment, manually trigger a first switch (K1) of the electronic cigarette so that the microprocessor control module (42) controls the battery rod assembly (1) to supply power to the heating assembly (3) and resets the smoking times.

14. The method of removing accumulated e-liquid in electronic cigarette according to claim 13, wherein after controlling the battery rod assembly (1) to supply power to the heating assembly (3), further comprises:
    after a presetting time, the microprocessor control module (42) controls the battery rod assembly (1) to stop supplying power for the heating assembly (3).

15. The method of removing accumulated e-liquid in electronic cigarette according to claim 13, wherein in the step S2, if the smoking times reach the default value, the microprocessor control module (42) firstly controls the battery rod assembly (1) to supply power to the atomization assembly (2), and when finishing that, the microprocessor control module (42) controls the battery rod assembly (1) to supply power to the heating assembly (3).

16. The method of removing accumulated e-liquid in electronic cigarette according to claim 13, wherein, in the step S2, if the smoking times reach the default value, the microprocessor control module (42) controls the battery rod assembly (1) to supply power to the heating assembly (3) and the atomization assembly (2) together, a sum of an output power of the atomization assembly (2) and the heating assembly (3) is equal to an output power of the atomization assembly (2) when individually working.

17. The method of removing accumulated e-liquid in electronic cigarette according to claim 12, wherein a specific method is: when a manual removal of the accumulated e-liquid is needed, a user turns on a second switch (K2) of the electronic cigarette so that the heating assembly (3) is electrically connected to a battery (11) inside the battery rod assembly (1) through the second switch (K2), and then an atomizing of the accumulated e-liquid begins, with finishing removing the accumulated e-liquid, the heating assembly (3) is stopped atomizing when the user turns off the second switch (K2).

18. An electronic cigarette provided with an accumulated e-liquid removal function, comprising an atomization assembly (2) configured for atomizing an e-liquid to produce smoke and a battery rod assembly (1) configured for supplying power to the atomization assembly (2), the electronic cigarette is provided with a smoke channel for smoke to flow through, wherein the electronic cigarette further comprises:
    a heating assembly (3) provided in the smoke channel and controlled by a control assembly (4) to produce heat to allow e-liquid accumulated in the smoke channel to be re-atomized;
    wherein the control assembly (4) comprises:

a smoking switch (41) is configured for sending an inhalation signal;

a microprocessor control module (42) is configured for receiving the inhalation signal and controlling the battery rod assembly (1) to supply power to the atomization assembly (2);

the microprocessor control module (42) is further configured for counting smoking times based on the inhalation signal and controlling the battery rod assembly (1) to supply power to the heating assembly (3) when the smoking times reach a default value, at the same time resetting the smoking times;

the atomization assembly (2) comprises a first electric wire (21), the heating assembly (3) comprises a second electric wire (31);

wherein the control assembly (4) comprises a second switch (K2), the heating assembly (3) is electrically connected to a battery (11) in the battery rod assembly (1) through the second switch (K2);

the heating assembly (3) comprises:

a liquid guiding rope (32);

the second electric wire (31) twined round an outside surface of the liquid guiding rope (32);

a ventilating pipe component (33) configured for fixed the liquid guiding rope (32);

wherein the ventilating pipe component (33) comprises a first ventilating pipe (332) configured for fixing the liquid guiding rope (32), the first ventilating pipe (332) is defined with at least two mounting holes (30) configured for allowing the liquid guiding rope (32) to pass through;

wherein the ventilating pipe component (33) further comprises:

a second ventilating pipe (331) defined at one end of the first ventilating pipe (332) and configured for avoiding an e-liquid adhesion, a third ventilating pipe (333) and a fixed pipe (334) defined outside the first ventilating pipe (332) in sequence.

\* \* \* \* \*